UNITED STATES PATENT OFFICE.

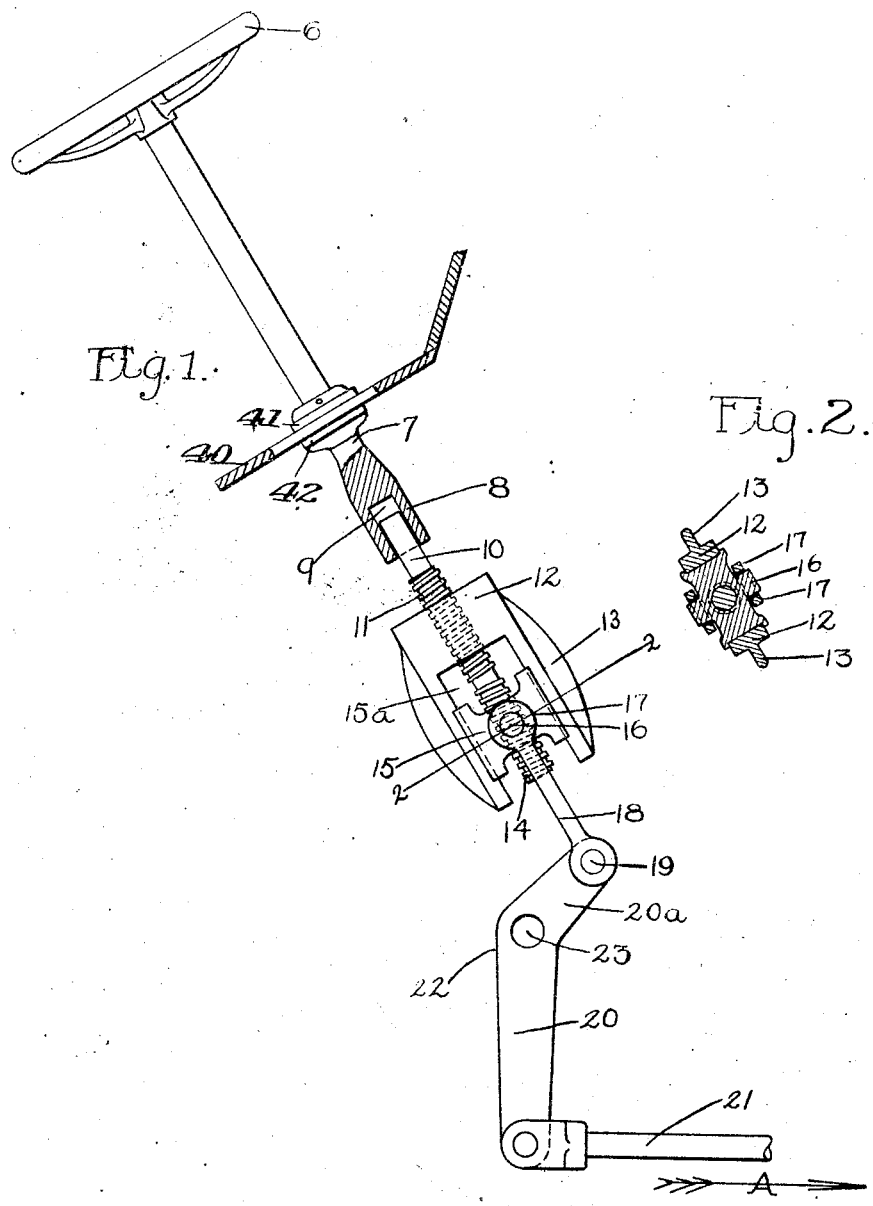

ARNOLD M. SQUIRE, OF CLEVELAND, OHIO.

STEERING-WHEEL DEVICE.

1,037,354.

Specification of Letters Patent.   Patented Sept. 3, 1912.

Application filed August 29, 1911.   Serial No. 646,691.

*To all whom it may concern:*

Be it known that I, ARNOLD M. SQUIRE, subject of King George V of England, residing at Cleveland, in the county of Cuyahoga and State of Ohio, have invented certain new and useful Improvements in Steering-Wheel Devices, of which the following is a specification.

This invention relates to operating devices for the steering wheels of automobiles and the like.

The object of the invention is to provide improved means for preventing back kick or shock being transmitted to the steering wheel, such as is caused by the wheels striking obstructions in the road.

A further object of the invention is to provide a quick acting steering device, which will be advantageous under conditions where quick action is essential, as in crowded streets.

A further object of the invention is to provide a steering gear that is easy to operate, simple and strong, not liable to get out of order or to cause accidents.

By the present invention all shocks are taken up in a heavy feed screw and sliding block and do not reach the steering wheel.

The invention is illustrated in the accompanying drawings of which—

Figure 1 is a side elevation of the gear. Fig. 2 is a section on the line 2—2 of Fig. 1.

Referring specifically to the drawings, 6 is a steering wheel to which the power is applied by the driver of the machine and it is mounted on the steering post 7 which has at its lower end a squared socket 9 in which fits the squared shank of the feed screw. This screw has a right hand thread 11 and a left hand thread 14. The right hand thread works through a block 12 which is fastened to the frame or some other suitable fixed part of the machine. Sliding block or crosshead 15 is mounted on the left hand thread 14, and this slides between guides 15ª which are integral with the block 12. The block has a boss 16 at each side, which engages with the yoke 17 of a link 18 the lower end of which is pivoted to the lever 22 at 19. The lever is fulcrumed at 23 and has a lower long arm 20 and an upper short arm 20ª, so as to increase the motion transmitted from the sliding block 15. The guides 15ª are reinforced by ribs 13.

The steering post 7 is supported against longitudinal movement by the floor 40 of the car, extending through a bearing opening in said floor and being retained in position by upper and lower collars 41 and 42 fixed to the post, above and below the floor, whereby the steering post is supported independently of the screw rod.

In operation, when the steering wheel and post are turned the screw 11 feeds in one direction through the block 12 and the sliding block or head 15 moves in the same direction, the shank 10 moving in or out in the socket 9 according to the direction of motion. The block 15, in consequence of the right and left threads on the screws, receives a double travel, and its movement is transmitted through the link to the lever, which will be connected to the steering knuckles of the wheels by a rod 21 and other well known parts. The right and left threads are better than a single thread of high pitch, because the latter has a tendency to overdraw or feed back, in which event a shock on the front wheels would be transmitted back through the lever to the block, and the pressure on the block might cause the screw to turn, and this in turn would tend to turn the wheel 6. With right and left threads of small pitch there is no overdraw or back lash, and therefore no shock to the wheel 6.

I claim:

1. In a steering device, the combination of a relatively fixed block, a steering post having a non-circular socket in the lower end, a screw rod working through the block having a noncircular shank slidable in the socket, and transmitting devices operatively connected to the screw and adapted for connection to the steering wheels, the steering post being supported independently of the screw rod, whereby shocks of the latter are not transmitted to the former.

2. In a steering device, the combination of a relatively fixed block having guides, a steering post supported independently of the block, a screw having right and left threads one of which works through the block, a crosshead slidable on the guides and mounted on the other thread for movement by turning the screw, the steering post having a telescoping non-rotatable connection to the screw, a lever adapted for connection to the wheels, and a link connecting the block and the lever.

In testimony whereof, I do affix my signature in presence of two witnesses.

ARNOLD M. SQUIRE.

Witnesses:
J. F. NASH,
STEDMAN J. ROCKWELL.